March 5, 1963      T. J. BUCKLEY      3,079,968

SELF-LOCKING SELF-TAPPING SHEET METAL SCREWS

Filed Aug. 26, 1959

INVENTOR
TIMOTHY J. BUCKLEY
BY

HIS ATTORNEYS 3,079,968
SELF-LOCKING SELF-TAPPING SHEET
METAL SCREWS
Timothy J. Buckley, Ridgewood, N.J., assignor to The
Nylok Corporation, Paramus, N.J., a corporation of
Delaware
Filed Aug. 26, 1959, Ser. No. 836,108
7 Claims. (Cl. 151—7)

This invention relates to improvements in self-tapping sheet metal screws and relates more particularly to self-tapping sheet metal screws which are also self-locking.

Machine screws, bolts, and the like have been rendered self-locking by providing them with resilient inserts as disclosed in the Brutus U.S. Patent No. 2,520,121 and the Boots Patent No. 2,539,887. The resilient inserts provide a locking action by forcing together the threads of the mating threaded elements at the opposite sides thereof from the insert. Attempts have been made to use such inserts in self-tapping sheet metal screws but these attempts have failed for the reason that when the screw is driven into the sheet metal the outer portion of the insert invariably is sheared off or damaged to the extent that its locking action is destroyed. Damage occurs to the insert even when an expansion space is provided in the insert-receiving recess of the screw as shown, for example, in the Brutus U.S. Patent No. 2,520,121.

Study of the difficulty encountered with the use of resilient inserts in self-tapping screws leads to the conclusion that the zero clearance between the sheet metal and the screw driven into the hole causes the projecting portion of the insert to be abraded or sheared away as the screw was driven into the metal. As a result, the part of the insert, if any, left projecting beyond the roots of the threads of the screw is of insufficient size to produce the reaction effect required to lock the screw in the metal.

In accordance with the present invention, self-tapping screws are provided which, as they are driven into the sheet metal, tap threads therein and a clearance for the resilient insert sufficient to prevent the portion of the insert extending beyond the roots of the screw threads from being sheared or abraded away.

More particularly, the new screws have enlarged portions between the tips or points of the screws and the resilient inserts therein to render the hole into which the screw is threaded slightly oversize and thereby provide the necessary clearance enabling the projecting portion of the insert to be deformed and compressed, without shearing or abrasion, between the screw and the wall of the mating hole, and without however producing a loose fit of the screw in the hole.

The insert may be in the form of a cylindrical plug, a rectangular or tapered strip, or the like, seated in a slot of general complementary shape.

For a better understanding of the invention, reference may be had to the accompanying drawings, in which—

Figure 1:
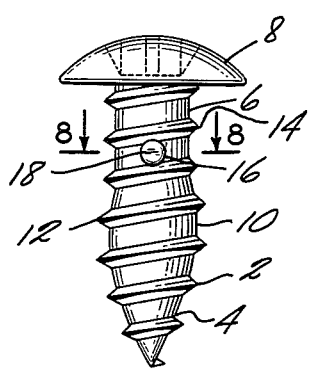
FIGURE 1 is a side view of a typical self-tapping screw embodying the present invention.

Referring to the drawing, FIGURE 1 discloses a tapered self-tapping screw 2 having a sharp point or tip 4 and an elongated cylindrical shank portion 6 adjacent the head 8 of the screw. A portion 10 of the shank adjacent to the tip of the screw 4 is greater in diameter than the shank portion 6. Threads 12 which extend around the shank portion of enlarged diameter also have somewhat greater root and crest diameters than elsewhere along the shank. The illustrated shank and thread portions of enlarged diameter are shown in exaggerated fashion in the drawings for the purpose of description, but in actuality the increase in diameter over shank portion 6 and thread portion 14 adjacent screw head 8 is preferably less than .005 inch.

Figure 8:
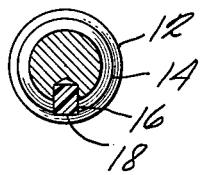
FIGURE 8 is a view in cross-section taken on line 8—8 of FIGURE 1.

Located in the upper shank portion 6 is a radial cylindrical hole 16 (FIGS. 1 and 8), in which is mounted a resilient locking plug 18, formed of "nylon" or its equivalent. The insert 18 is of such length with respect to the hole, that its outer end projects beyond the root line of the threads and may extend flush with or slightly beyond the crest of the threads 12 adjacent thereto. As explained above, the plug is deformed when the screw is driven into a hole or an upset portion around a hole in a sheet of metal and due to its resiliency reacts to urge the screw sideways into increased cohesive frictional engagement with the metal diametrically spaced from the insert or plug.

When the screw is driven into a drilled or punched hole in a piece of metal which may or may not be upset to provide additional thickness, the thicker portion 10 of the shank and threads of greater crest diameter slightly enlarge the hole in the metal to provide a slight clearance between the shank portion 6 of the screw and the side of the hole and to enable the resilient insert to be deformed between the screw threads, screw shank and the side of the hole without abrading or shearing off the projecting portion of the insert. The .005 inch diameter clearance, or .0025 inch radius clearance or less is insufficient to result in a "loose fit" of the screw and the resiliency of the insert and its reaction force securely locks and retains the screw against rotation in the metal.

Figure 2:
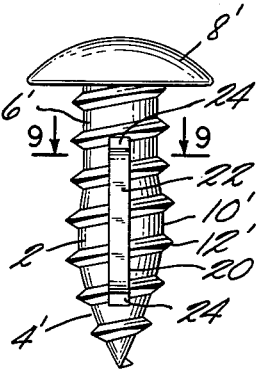
FIGURE 2 is a side view of an embodiment of the present invention, containing a modified form of locking insert.
Figure 9:
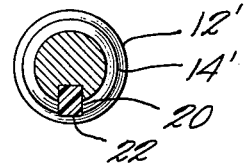
FIGURE 9 is a view in cross-section taken on line 9—9 of FIGURE 2.

FIGURE 2 is a modification of the invention in which the self-tapping screw has a threaded shank provided with a tip 4', a shank portion 6' of generally uniform diameter adjacent head 8', a thickened portion 10', and threads 12' conforming to the shank 10' as described above. The shank contains a rectangular slot or recess 20 (FIGURES 2 and 9) for receiving a strip 22 of resilient material such as "nylon" or its equivalent. The slot 20 may be formed by a milling operation with a circular cutter to form concavely curved bottom portions 24 in the recess at the ends thereof. The strip 22 may be shaped to be press fitted in the slot but is somewhat shorter in length than the slot to provide expansion areas 24 at each end of the slot formed by the milling cutter. As shown in FIGURE 9, the resilient insert extends about flush with or slightly above the crests of the threads 14'. In the area where the threads 12' are of greater crest diameter, the outer surface of the insert is slightly below the crest of the threads. When the screw is screwed into a hole in a piece of metal, some of the insert at the thickened portion of the shank may be abraded or sheared away, but the part of the insert strip in the shank portion 6' will be essentially intact and will provide the desired locking action.

Figure 3:
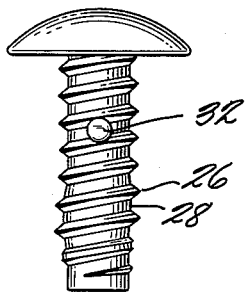
FIGURE 3 is a side view of a modified form of self-tapping screw utilizing the present invention.

FIGURE 3 illustrates another type of self-tapping screw having a flat tip which is of a type used in sheet metal, plastics and the like. This screw has threads 26 and a shank portion 28 of greater diameter than the remainder of the threads and shank of the screw. A resilient insert 32 is located between the head of the screw and the enlarged portion of the shank.

Figure 4:
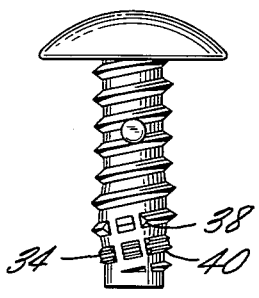
FIGURE 4 is a side view of another form of self-tapping screw according to the invention.

FIGURE 4 illustrates a screw similar to the screw shown in FIGURE 3 except that the thread 34 is interrupted to improve its tapping action. The first three threads are shown as interrupted so as to provide a cutting surface 38 on the third thread which is one of the threads of enlarged diameter. The leading end of thread 40 is double thread of reduced height. This enables the complemental threads to be tapped in the sheet metal or the like without undue strain on any one or any portion of the threads of the screw.

Figure 5:
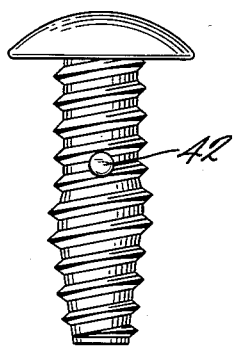
FIGURE 5 is a side view of still another form of the self-tapping screw.

FIGURE 5 is a modification of the embodiment of FIGURE 3 showing a longer screw having the enlarged or thickened portion of the shank and the larger diameter threads spaced farther from the free end or tip of the screw than in the screws described above. The expansion to maximum diameter in the FIGURE 5 embodiment is more gradual, resulting in easier driving of the screw into the sheet metal.

Figure 6:
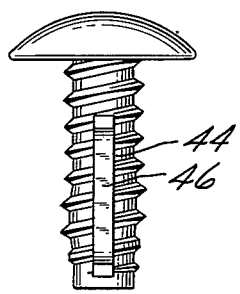
FIGURE 6 is a side elevational view of a self-tapping screw utilizing a modified form of locking element of the type shown in FIGURE 2.

The screw shown in FIGURE 6 is similar to the screw shown in FIGURE 3 but having therein a slot 44 and resilient locking strip 46 similar to the locking strip illustrated in FIGURE 2.

Figure 7:
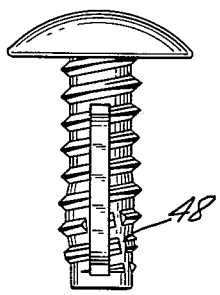
FIGURE 7 is a side elevational view of a modified self-tapping screw having a locking strip mounted thereon.

The screw shown in FIGURE 7 is similar to that shown in FIGURE 6 with the exception that the threads are interrupted as at 48.

Although the resilient inserts are preferably made of nylon, other materials resilient or elastic in nature and capable of providing a gripping surface with the metal or other composition of the female member can be utilized.

I claim:

1. A self-tapping, self-locking sheet metal screw comprising a shank having a plurality of convolutions of a helical screw thread thereon for tapping threads in sheet metal, said thread being of substantially uniform cross-section throughout the major portion of its length and having an axial root dimension at least as great as the axial base dimension of the thread, said shank having a tip smaller than said shank and a head at the end of said shank opposite said tip, a portion of said shank between said head and tip having threads of greater root diameter than the remainder of said shank, a recess in the side of the screw shank, at least a part of which is positioned between said portion of greater root diameter and said head, and a resilient insert member in said recess extending radially beyond the root line of said portion of said thread between said head and said enlarged root diameter portion.

2. A self-tapping screw as claimed in claim 1, in which said shank and thread portion of greater diameter are not substantially in excess of .005" greater in diameter than the shank portion having said recess and insert member therein.

3. A self-tapping screw as claimed in claim 1 wherein said recess is substantially cylindrical and extends radially of the screw shank, and said resilient insert member is frictionally engaged within said recess and has a portion extending substantially to the crests of the thread adjacent thereto.

4. A self-tapping screw as claimed in claim 1 wherein said recess is a slot in and extending lengthwise of one side of said screw shank and said resilient insert member is substantially complemental to and fits within said slot with its outer edge extending beyond the roots of the thread adjacent thereto.

5. A self-tapping screw as claimed in claim 4 wherein said slot extends parallel to the axis of the screw and substantially the full length thereof.

6. A self-tapping screw as claimed in claim 4 wherein said slot comprises end portions permitting expansion of said resilient insert member.

7. A self-tapping sheet metal screw comprising a head, a shank fixed to said head and having an outer end of smaller diameter than the remainder of said shank, said shank having a first shank portion adjacent said head portion and a second shank portion between said outer end and said first shank portion, a recess in said shank extending into said first shank portion, a resilient locking insert in said recess, said second shank portion being of greater diameter than said first named shank portion, and a plurality of convolutions of a helical screw thread on said shank, said thread being of substantially uniform cross-section throughout the major portion of its length for tapping threads in sheet metal, said thread having an axial root dimension at least as great as the axial base dimension of said thread, said second named shank portion having thread portions thereon of slightly enlarged root and crest diameters adapted to form an enlarged female socket thread providing clearance for expansion of said resilient insert, said insert extending radially beyond the root line of said thread on said first shank portion.

References Cited in the file of this patent

UNITED STATES PATENTS

| | | |
|---|---|---|
| 192,636 | Collins et al. | July 3, 1877 |
| 1,064,934 | Ryan | June 17, 1913 |
| 2,407,160 | Kahn | Sept. 3, 1946 |
| 2,409,638 | Lyon | Oct. 22, 1946 |
| 2,520,121 | Brutus | Aug. 29, 1950 |
| 2,539,887 | Boots | Jan. 30, 1951 |
| 2,796,906 | Buckley | June 25, 1957 |
| 2,956,293 | McKay et al. | Oct. 18, 1960 |